US008537994B2

(12) United States Patent
Hillier

(10) Patent No.: US 8,537,994 B2
(45) Date of Patent: Sep. 17, 2013

(54) SYSTEM GRANTING ACCESS TO APPLICATION DATA AND METHODS THEREOF

(75) Inventor: Peter Matthew Hillier, Ottawa (CA)

(73) Assignee: Mitel Networks Corporation, Ottawa, Ontario (CA)

( * ) Notice: Subject to any disclaimer, the term of this patent is extended or adjusted under 35 U.S.C. 154(b) by 133 days.

(21) Appl. No.: 13/065,948

(22) Filed: Mar. 31, 2011

(65) Prior Publication Data

US 2012/0250845 A1   Oct. 4, 2012

(51) Int. Cl.
*H04M 1/56* (2006.01)
*H04M 15/06* (2006.01)

(52) U.S. Cl.
USPC .............. 379/142.05; 379/142.01; 379/142.17

(58) Field of Classification Search
USPC .............. 379/142.01, 142.03, 142.05, 88.23, 379/83.02, 93.03, 142.17, 245, 247
See application file for complete search history.

(56) References Cited

U.S. PATENT DOCUMENTS

| 5,592,537 | A | * | 1/1997 | Moen | .......................... 379/88.11 |
| 5,864,612 | A | | 1/1999 | Strauss et al. | |
| 6,496,571 | B1 | | 12/2002 | Wilson | |
| 6,785,368 | B1 | * | 8/2004 | Eason et al. | ................ 379/88.19 |
| 2002/0067816 | A1 | * | 6/2002 | Bushnell | ................... 379/201.02 |
| 2003/0139172 | A1 | | 7/2003 | Lampela et al. | |
| 2005/0100150 | A1 | * | 5/2005 | Dhara et al. | ............. 379/142.01 |
| 2005/0163298 | A1 | | 7/2005 | Creamer et al. | |
| 2009/0171910 | A1 | * | 7/2009 | Sarkeshik | .......................... 707/3 |
| 2010/0091959 | A1 | * | 4/2010 | Miki et al. | .................. 379/88.17 |
| 2010/0241595 | A1 | * | 9/2010 | Felsher | .......................... 705/400 |
| 2011/0040964 | A1 | * | 2/2011 | Nussbaum et al. | ........... 713/155 |

FOREIGN PATENT DOCUMENTS

EP   1211875 A2   6/2002

* cited by examiner

*Primary Examiner* — Binh Tieu

(57) ABSTRACT

A system granting access to application data and methods thereof are provided in the present disclosure. Application data can be sent that can be utilized by applications resident within a telephony switching system or end devices involved in a call. When the calling party dials the called party, the switching system can be triggered to substitute a database key into the calling party number. The switching system can use the act of making the call to enable permission for the called party to access the data referenced by the database key. The telephony switching system, having provided the key, is capable of mapping the key back into the original calling party number. This allows the calling party number, through the database key, to be stored as a contact or dialed from a call log, which can provide backwards compatibility to devices that do not support this feature.

16 Claims, 6 Drawing Sheets

SYSTEM GRANTING ACCESS TO APPLICATION DATA AND METHODS THEREOF

TECHNICAL FIELD

This disclosure generally relates to communications, and more particularly, to the secure exchange of application data from the calling party to the called party using a caller identification system.

BACKGROUND

Caller identification translates a calling party into a name and number for display on the called device to allow the called party to recognize the calling party. For example, when a calling party dials the called party, a caller identification system recognizes that the calling party is a customer and verifies that the calling party is not blocked. In turn, the identification system generates name and number information referring to the calling party and sends it to the called party. When the called party's device "rings", the called party sees the name and number information of the calling party.

Some phones locally store additional information about the calling party, such as a picture, birthday, or place of employment. If the called party has stored other information about the calling party, for example, it would be displayed on the called party's device. This information is owned and controlled by the called party. In other phones, a computer telephone integration (CTI) application on a personal computer or mobile application connects to a server to obtain additional information about a call, for example, an employee directory. This uses the incoming calling party number to obtain more information such as where the calling party is located, organizational chart or picture, etc. The calling party number is used by the application as a key to retrieve this additional information.

Security is one of many drawbacks in current systems as application data is not protected or restricted and is generally accessible to all individuals. Security features cannot be implemented when the information is owned and controlled by the called party. Furthermore, anyone with the application and a phone number is given access to the application data when a call is made, or depending on the application, a call does not even need to be made.

The world of social media truly extends the identity of a person but has little relation to the basic telephony concepts of caller identification or telephone numbers. Accessing social media information requires a computing device and application, as well as information such as a user name or email address. Access to information is controlled via requests to "join" or "friend" other users with the application. These requests must be granted and reciprocated before information is exchanged.

The common element of all social media applications is the use of a unique identifier to represent a user. Two users who wish to connect must exchange this unique identifier and grant access to each other, perhaps with varying privilege levels to the application data. A mobile device can store a person's social media information with their number as part of a contact entry, but this implies the social media information is known in advance when the contact is created. An incoming call from a previously unknown person cannot be used to obtain social media information.

A centralized directory or other database system is used to lookup the number and locate the email address or other social media information associated with the number, if available. This information is used with the social media application directly. For example, using Facebook® application, a username is found and a friend request is made. This relies on the Facebook access control list to then wait until the friend accepts. It also exposes the information to anyone who has access to this directory. A telephone number alone is not unique enough to provide a one to one mapping, as is the case with a home phone number containing many Facebook users.

Modifying caller identification is not a new concept, but the name portion is critical to recognizing the caller, and the number portion is limited in size and formatting such that it is not suited to carrying application specific data. It would not scale to support many applications, as there would be no way to associate any given data to a specific application. Moreover, if the called device did not support the application, no behavior would be defined. The value of the calling party number is that it is stored as a contact, or retrieved from the device call logs, and used to contact the original caller. So direct called party number spoofing would break traditional usage models and not be compatible with use cases of telecommunication systems.

Social media applications often embed phone numbers and click-to-dial concepts, but this is used from within the application to reach out to the telephony network. It does not provide a mechanism for the telephony network to reach into the media application. If the originating and destination device support texting, a text message is sent with the information. However, a separate call would be made if the user actually wanted to speak to the person.

Voice over internet protocols (VoIP) are augmented to pass data for use by the end system or intermediate switching system applications. This, however, is not compatible across any non-VoIP transmission hops or devices. All VoIP gear in the path of the call must support the signaling to insure end to end success.

A need therefore exists to allow a basic phone call to provide application data that can be used to drive behaviors on the called device. At the same time, the calling party name should reflect who is calling and the number provided should be a routable directory number so that it can be used to reach the original caller, for example, the call needs to be returned or it is stored as a contact.

BRIEF DESCRIPTION OF DRAWINGS

The novel features believed to be characteristic of the application are set forth in the appended claims. In the descriptions that follow, like parts are marked throughout the specification and drawings with the same numerals, respectively. The drawing figures are not necessarily drawn to scale and certain figures can be shown in exaggerated or generalized form in the interest of clarity and conciseness. The application itself, however, as well as a preferred mode of use, further objectives and advantages thereof, will be best understood by reference to the following detailed description of illustrative embodiments when read in conjunction with the accompanying drawings, wherein:

DESCRIPTION OF THE APPLICATION

Figure 1:
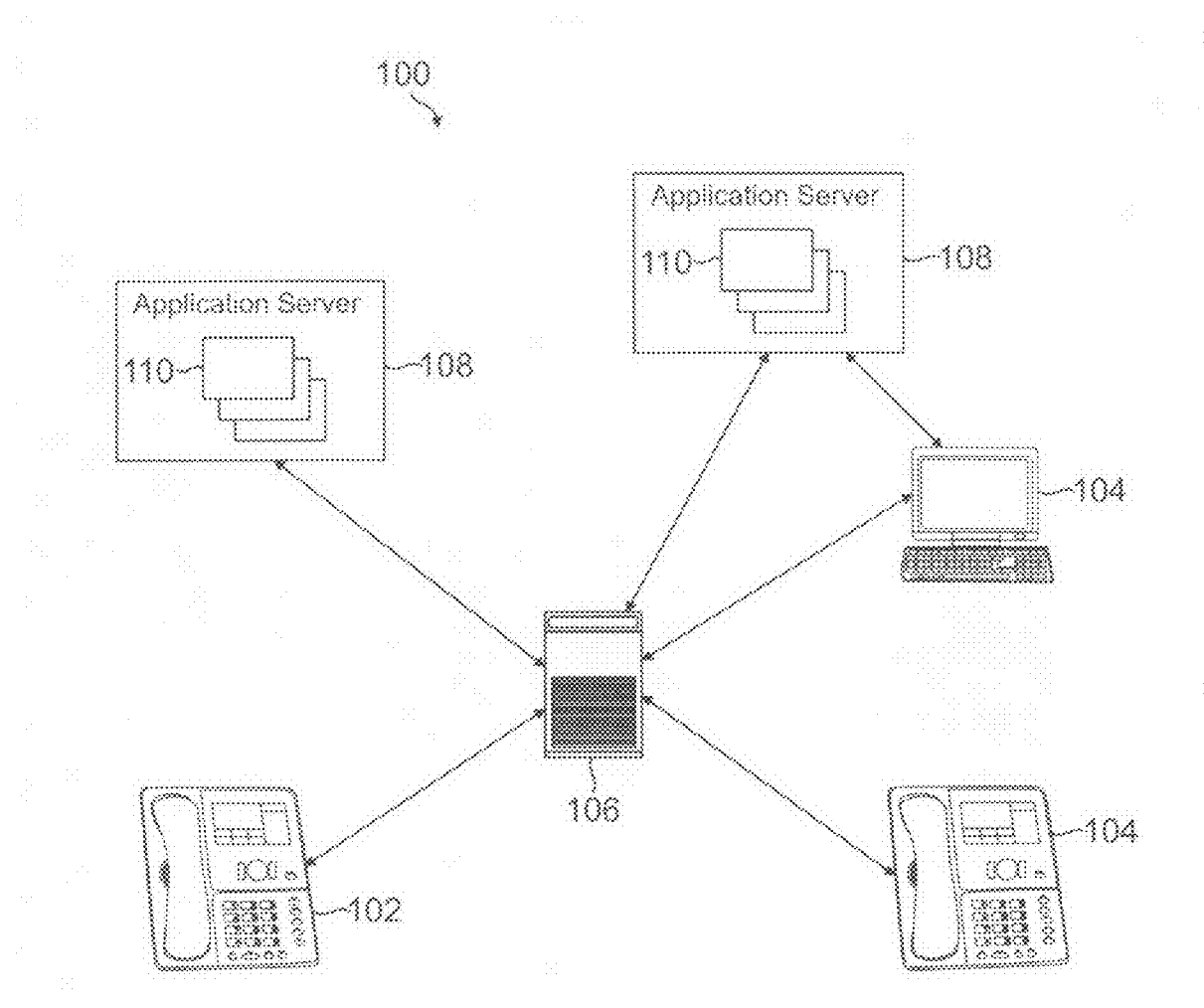
FIG. 1 is a block diagram representing an illustrative environment for providing access to application data through a switching system in accordance with one aspect of the present disclosure.

The description set forth below in connection with the appended drawings is intended as a description of presently preferred embodiments of the application and is not intended to represent the only forms in which the present application can be constructed and/or utilized. The description sets forth the functions and the sequence of steps for constructing and operating the application in connection with the illustrated embodiments. It is to be understood, however, that the same or equivalent functions and sequences can be accomplished by different embodiments that are also intended to be encompassed within the spirit and scope of this application.

The present disclosure relates to overloading the use of a caller identification system to provide application specific data and restricting access to that data to the called party. Access to the application data is limited and controlled through the caller identification system to certain or all individuals by the calling party. In one illustrative embodiment, a method for extending basic telephony signaling is provided. Information can be sent that can be utilized by applications resident within a telephony switching system or end devices involved in the call. When the calling party dials the called party, the switching system can be triggered to substitute a database key into the calling party number. The switching system can use the act of making a call to enable permission for the called party to access the data referenced by the database key.

The specific database key, and the contents associated with it, are controlled by a feature access code or other application integration methods such as computer telephone integration (CTI) concepts or user created content (UCC) known to those skilled in the relevant art. The telephony switching system, having provided the key, is capable of mapping the key back into the original calling party number. This allows the calling party number, through the database key, to be stored as a contact or dialed from a call log, which can provide backwards compatibility to devices that do not support this feature. Optionally, the database key can be provided directly by the calling party, in which case the switching system can pass the key to the called party and not substitute it with the calling party's true number. In this scenario the telephony switching system typically maintains the calling party number to database key mapping for purposes of reverse lookup.

Numerous advantages can be provided by the telephony switching system as shown by the illustrative embodiments described above. The telephony switching system can replace the calling party number with information that can be used by an application at the destination, or which can trigger an event when the provided number is dialed. The calling party number can still be used by any device to contact the original caller, thus preserving all historical intentions of the calling party number and providing backwards compatibility. The preservation of the calling party number within the switching system allows the solution to work over non-voice over internet protocol (VoIP) networks. Furthermore, other devices that are not within a call cannot access this information since they were not involved in the original call scenario. Many additional features and elements of the present disclosure will become apparent to those of skill in the relevant art as provided for in the following description. The applications are only examples to illustrate uses, and are not intended to be limiting to the present disclosure. Before describing additional embodiments, an exemplary environment for providing application data will be described.

Turning now to FIG. 1, a block diagram representing an illustrative environment 100 for providing access to application data 110 through a switching system 106 in accordance with one aspect of the present disclosure is provided. The switching system 106 can be referred to, but is not limited to, as a switch or telephony network. In one embodiment, the switching system 106 can take the form of a caller identification system, which is known in the relevant art. The switching system 106 can include one or more computing systems and is not limited to a single entity. In one embodiment, the switching system 106 can be a private branch exchange. Typically, the switching system 106 can take the form of a server having a processing unit, system memory, and system bus that operatively couples various system components. A hard disk drive, magnetic disk drive, optical disk drive and their associated computer-readable medium can provide nonvolatile storage of computer-readable instructions and data structures for the switching system 106.

The switching system 106 can route a call from a calling device 102 to a called device 104. In addition, the switching system 106 can receive a calling party number from the calling device 102 and generate the name and number associated with the calling party. The identity of the calling party can then be provided on a display of the called device 104. The calling device 102 and the called device 104 can be a mobile phone, smart phone, desktop computer, laptop, personal device, handheld or almost any other type of electronic device.

The calling party can use a feature access code to denote some form of application on an application server 108. Instead of the switching system 106 sending the calling party number, the switching system 106 can send a database key. For example, instead of the phone number 1-555-555-5555, the calling party can provide *7645678. When the called device 104 receives the number *7645678, the device 104 can display the name of the calling party on its display. If the called party returns the call using the missed call log, or because they stored the number as the contact for the calling party, the switching system 106 can recognize that the number provided is a database key and not an actual phone number i.e. 1-555-555-5555. The switching system 106 can access a database using the key, and determine the true number of the calling device 102 which was stored in the database entry. Typically the database key to number resolution is performed regardless of permission such that most parties can call the calling party. In one embodiment, the application server 108 can handle the phone number to database key translations instead of the switching system 106.

Application servers 108 can be connected to the switching system 106 or can themselves be entirely separate components as shown in FIG. 1. One or more application servers 108 can be employed within the environment 100. The application server 108 can have a processing unit, system memory, and system bus that operatively couples various system components. A hard disk drive, magnetic disk drive, optical disk drive and their associated computer-readable medium can provide storage of computer-readable instructions and application data 110 for the application server 108.

The application data 110 can be fully owned or centralized by the switching system 106, with applications assigned automatically via class of service or similar settings, or using feature access codes. Distributed environments 100 can also be provided where the calling device 102 and called device 104, in addition to the switching system 106, have applications, such as thin clients, that interwork together. In VoIP networks, which could simply pass the extended data 110 in the signaling, benefits can still be realized from the centralized application data 110 with a database key and access control. The alternative involves passing the data 110 with the call, which could be rerouted in some manner. When the call is forwarded at the destination side, access to the information can optionally be protected to prevent the forwarded caller from accessing it.

The application server 108 can maintain data 110 that is associated with Facebook®, LinkedIn® or other social network. In one embodiment, client profiles for employees within an organization can be stored within the application server 108. Different types of data 110 can be used and can be limitless in some embodiments. Application data 110 can be uploaded to the application server 108 by the calling device 102 or called device 104 or be changed as necessary. The application data 110 can also be changed over the Internet through typical processes known to those skilled in the relevant art. The switching system 106 can allow for varying levels of permission to the application data 110 by maintaining an access control list. Alternatively, each application server 108 can also maintain an access control list.

The switching system 106 can communicate directly with the application server 108 to map access codes to database keys. In one embodiment, the switching system 106 can convert dialed database keys to numbers as well as provide the server 108 information to create the access control list to database information. A client application can exist on the called device 104 that can communicate directly with the application server 108 to update or retrieve information. Alternatively, the functionality can be entirely handled between the application server 108 and switching system 106.

Applications can be launched on the called device 104 based on the calling party number. This implies that the application does not need to be active to receive a separate signal via a data communications path to access the calling party application data 110. For example, incoming calls from numbers starting with *70 would launch a web browser to the LinkedIn® page of the called device 104 using the trailing digits as the database key to access the LinkedIn® information.

Application data 110 can be accessed using a database key provided in the calling party number. The key follows the standard telecom limits for calling party number, but has a format that is largely application dependent. These can be telephony specific applications or be "Enabler Apps". Enabler Apps can use a telecommunication system to extract the additional caller information, such as database information, and then use this information outside of the telephony network, for example, sending a Facebook® friend requests to a caller.

Applications can be differentiated at the switching system 106 by configuration or by feature access code. In one example, an application called "Caller Profile" can be used which can be applied to employees by configuration thus, the employees do not need to be aware of access codes. Employees can have a five digit account with the Caller Profile application which they can then use to access the application server 108 and change their profile settings, including profile picture. The authorization provided to the called device 102 can be given to the called party or to their device 104. After authorization, and as shown in FIG. 1, the called device 104 can access information directly from the application server 108 or go through the switching system 106.

Figure 2:
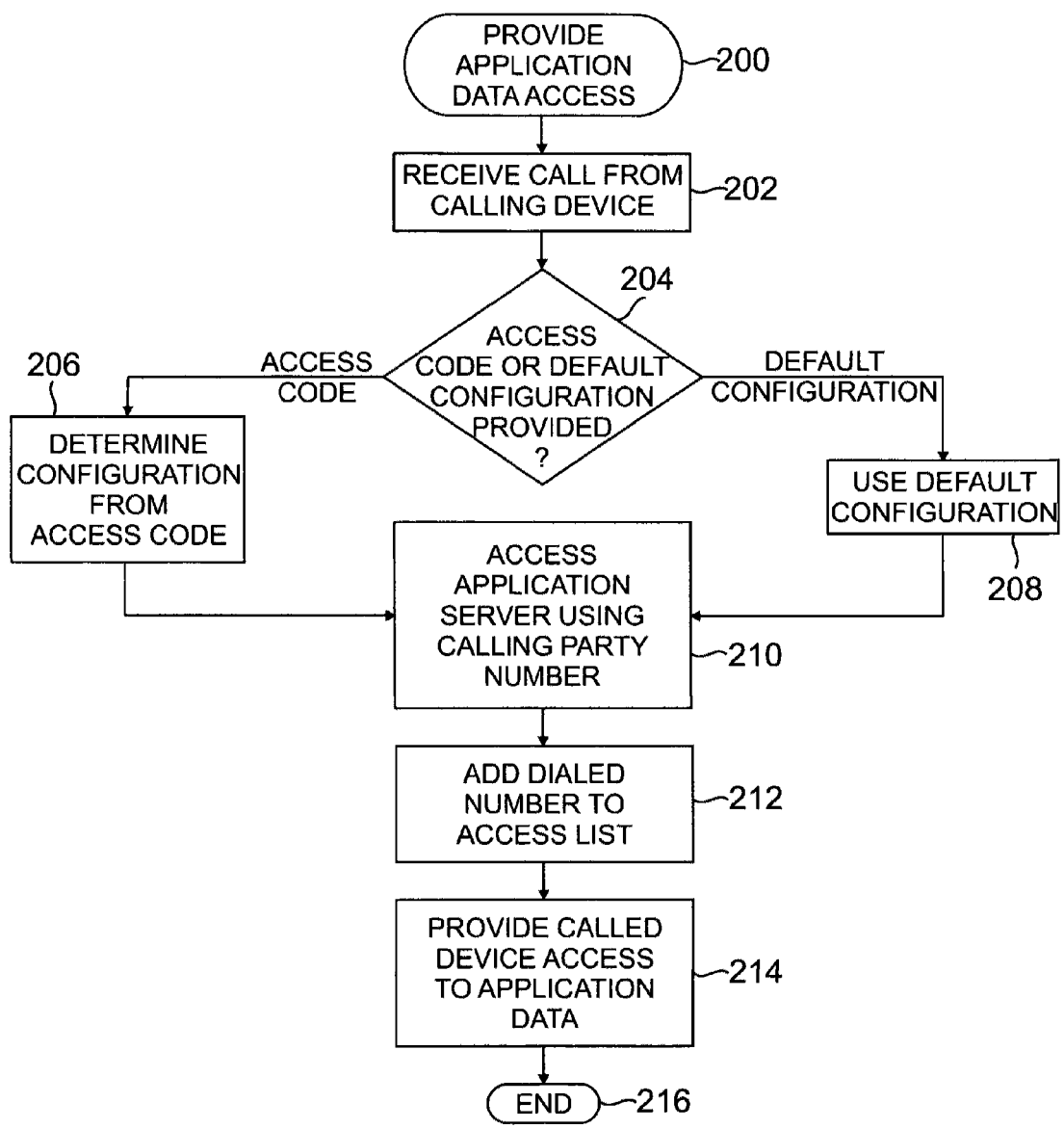
FIG. 2 is a flow chart representing illustrative processes for providing access to application data in accordance with one aspect of the present disclosure.
Figure 3:
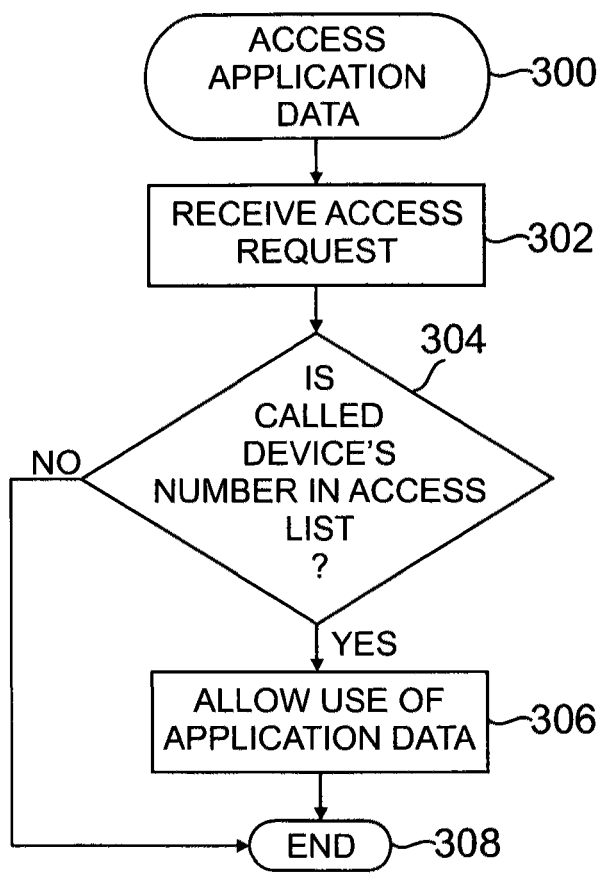
FIG. 3 is a flow chart representing illustrative processes for accessing the application data in accordance with one aspect of the present disclosure.

FIG. 2 provides a flow chart showing exemplary processes for providing application data 110 access while FIG. 3 provides a flow chart that describes illustrative processes for accessing the application data 110. The technology described therein can be implemented as logical operations and/or modules in one or more systems in the calling device 102, called device 104, application server 108 or switching system 112. The logical operations can be implemented as a sequence of processor-implemented steps executing in one or more computer systems and as interconnected machine or circuit modules within one or more computer systems. Likewise, the descriptions of various component modules can be provided in terms of operations executed or effected by the modules. The resulting implementation is a matter of choice, dependent on the performance requirements of the underlying environment 100 in which the described disclosure is implemented. The logical operations making up the embodiment of the disclosure described herein are referred to variously as operations, steps, objects, or modules. It should be understood that logical operations can be performed in any order, unless explicitly claimed otherwise or a specific order is inherently necessitated by the claim language.

Referring now to FIG. 2, a flow chart representing illustrative processes for providing access to application data 110 in accordance with one aspect of the present disclosure is provided. The processes can begin at block 200. At block 202, the switching system 106 can receive a call from a calling device 102. An identifier of the called device 104 is provided. The identifier can be the called device's phone number, extension or other attribute describing the called device 104. Other forms of communication can be made by the calling party to give authorization regardless of whether an actual call is made or not. The switching system 106 can determine the name and number information of the calling device 102.

At decision block 204, the switching system 106 can determine whether an access code is provided or a default configuration is used. There can be numerous types of access codes. In one embodiment, the access code can determine which application server 108 to use. The access code can also determine types of privileges given, for example, certain items of data 110 can be restricted with varying degrees of access privileges. When no access code is provided, nor default configuration used, the switching system 106 can interpret this as a regular call whereby the switching system 106 establishes communication between the calling device 102 and the called device 104.

When an access code is provided, at block 206, the switching system 106 can determine what type of configuration to use based on the access code provided. For example, the code can be used to grant access to a resume from Monster® to the called device 104. Alternatively, access to the status of the calling party on Facebook® can be provided. Those skilled in the relevant art will appreciate that there are a number of different access codes that can be used with the application servers 108 and the application data 110 therein.

At block 208, when no access code has been given, a default configuration can be used. For example, a default configuration can be established where access to a user's resume is always provided. The default configuration can be changed in the switching system 106 by entering in another access code.

The switching system 106 can access the application server 108 using a calling party number of the calling device 102 at block 210. The application server 108 can associate the calling party number to application data 110. The switching system 106 can add the dialed number associated with the called device 104 to an access list for the application data 110 at block 212. The switching system 106 can provide the called device 104 access to the application data 110 at block 214. In addition, name and number information can be provided to the called device 104. The processes for establishing access for the called device to the application data 110 can end at block 216.

Figure 4A:
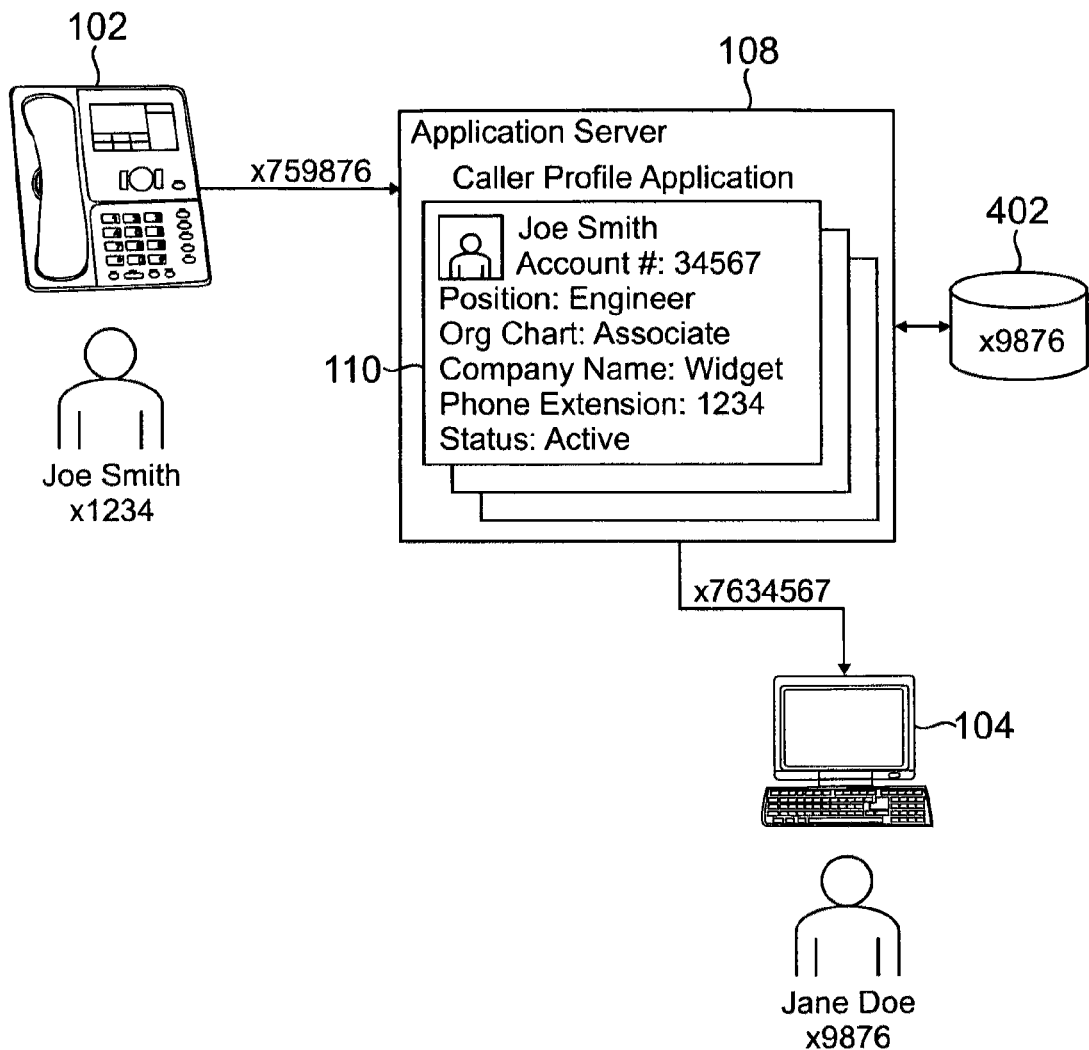
FIG. 4A is a block diagram showing an exemplary scenario in which access to application data is provided in accordance with one aspect of the present disclosure.

FIG. 4A is a block diagram showing an exemplary scenario for providing access to application data 110 in accordance with one aspect of the present disclosure. For purposes of illustration, the scenario includes Joe Smith who works at a company that uses a caller profile application. The company has prefilled many of his business settings, for example, position, organization chart, company name and company phone extension as application data 110 within a server 108.

Joe can access and upload a picture and set his current status within the application server 108. To update his application data 110, Joe can access a website through a network or in another embodiment, can make a call to the application server 108. As shown in FIG. 4A, Joe has an account number of 34567 and an extension of 1234. In this scenario, Joe intends to provide access to his application data 110 to Jane Doe at extension 9876. In one embodiment, Joe can chose to dial *759876 whereby *75 is the command to send "Caller Profile" information and 9876 is Jane's extension. The "*" can represent that an access code is being entered. Those skilled in the relevant art will appreciate that there a number of different ways to provide the access code.

When the switching system 106 is configured to use the application on the application server 108 by default, Joe can simply dial 9876. Alternately, if Joe had a smart phone running the Caller Profile client application, the phone can be configured to automatically insert the *75 access code on all calls. The switching system 106, upon recognizing the *75 feature access code or via configuration settings, can use Joe's calling party number to access his Caller Profile account number. This is done by the switching system 106 communicating with the Caller Profile application server 108 in one embodiment. The switching system 106 can be trusted by the server 108 thus allowing calling party numbers recognized by the switching system to be queried.

The switching system 106 can add Jane's number to the access control list 402 for Joe's account as shown in FIG. 4A. The access list 402 can be maintained within a database that is separate from or attached to the application server 108. In one embodiment, the access control list 402 can be located on the switching system 106, or if client applications are used on the called devices 104 that communicate directly with the application server 108, the interface between the switching system 106 and application server 108 can be leveraged to assign the access control list 402. By Joe calling Jane, he is granting Jane access to his application data 110.

Once the access control list 402 has been updated, the switching system 106 can replace Joe's calling party number such that the information sent to Jane's device 104 is his correct name "Joe Smith". In addition, information regarding access to Joe's application data 110 can be sent, for example, the number *7634567 is provided to Jane's called device 104. *76 can be the command to access "Caller Profile" information and 34567 can refer to Joe's account information.

In one embodiment, the same feature access code provided by Joe can be used. The notion of "send" or "access" caller profile data 110 can be resolved by a subcode in the calling party number format, or via the number itself. Different access codes can be interleaved to perform different functions.

FIG. 3 is a flow chart representing illustrative processes for accessing the application data 110 in accordance with one aspect of the present disclosure. The processes can begin at block 300. At block 302, the switching system 106 can receive an access request from the called device 104 who earlier received permission to retrieve the application data 110.

At decision block 304, the switching system 106 can determine whether the called device's number is in the access control list 402 that was stored either on the switching system 106 or the application servers 108. When the called device's number is not in the access control list 402, the called device 104 is not granted access to the application data 110 and the processes can end at block 308. An error message can be given providing that there was an error in accessing the application data 110.

When the number of the called device 104 is within the access control list 402, the switching system 106 can allow the use of the application data 110 at block 306. The processes can end at block 308. The switching system 106 can be used as an intermediary whereby it can access the application servers 108 for the data 110. As shown in FIG. 1, upon receiving access from the calling device 102, the called party can use the granted access to directly communicate with the appropriate application server 108 to retrieve the application data 110 associated with the calling party. Alternatively, the called party or called device 104 can access the data 110 through the switching system 106.

Figure 4B:
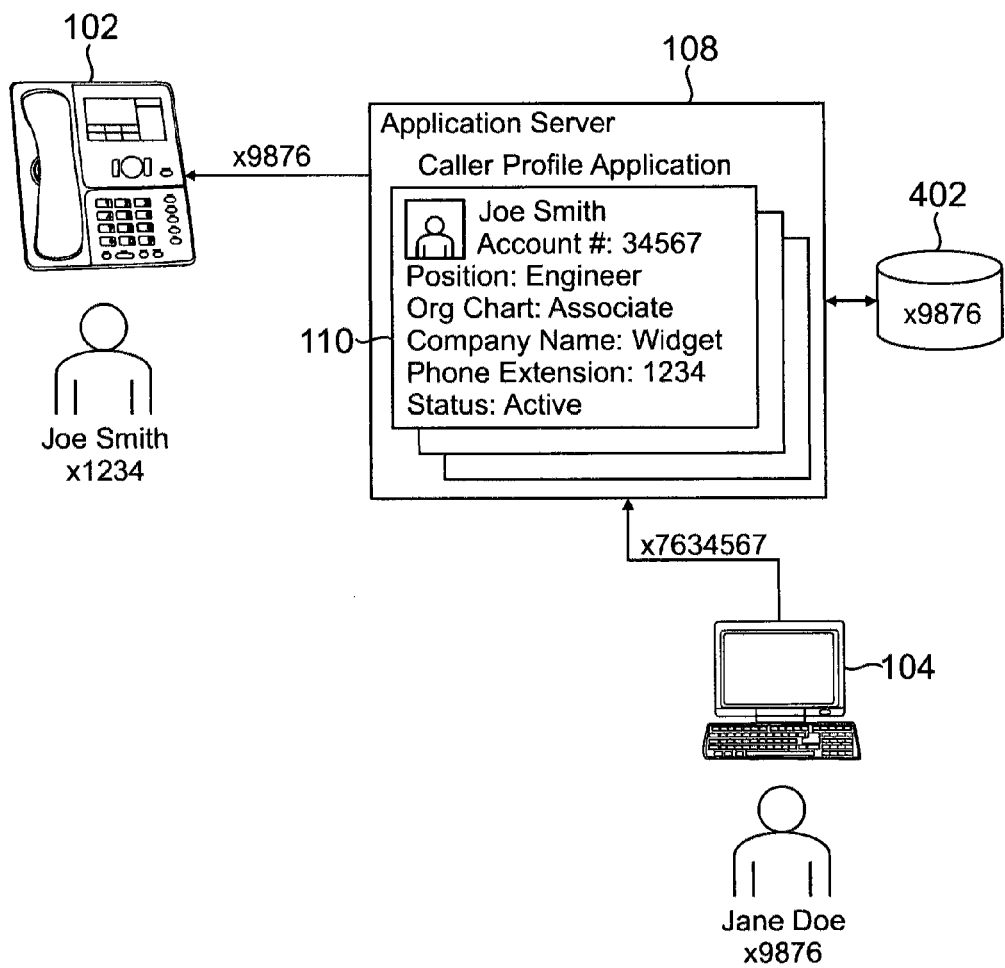
FIG. 4B is a block diagram showing exemplary procedures to access the application data within the scenario of FIG. 4A in accordance with one aspect of the present disclosure.

FIG. 4B is a block diagram showing exemplary procedures to access the application data 110 within the scenario of FIG. 4A in accordance with one aspect of the present disclosure. When access is granted, Jane's called device 104 having the Caller Profile client application can recognize that the *76 as an indication that additional data 110 is available via the Caller Profile application. The called device 104 or associated device with the called party can access the Caller Profile application and thereafter, present Joe's application data 110. If Jane's called device 104 does not support the application, Jane can recognize the number prefix and alternatively chose to use her computer or other computing device that was not called to access more information about Joe using this number. Typically the information granting access to Jane would allow several devices 104 to access the data 110.

As shown in FIG. 4B, Jane can have the Caller Profile client application on her personal computer 104 that uses CTI to get the calling party number. In one embodiment, Jane can choose to just treat the number as any ordinary number. She can answer the call, or it may be missed, depending on her availability. In one embodiment, Jane can access the data even though the call was missed.

The number provided by the switching system 106 to Jane is a "routable number". Due to the nature of telephony, typically applications support, at a minimum, resolving a database key to a routable number. The database key can be limited to the calling party number format. In one embodiment, Jane can store this as her contact for Joe or it can be dialed directly from the call log. When Jane dials *7634567, the switching system 106 can recognize *76 as an indicator of a Caller Profile account number. The switching system 106 can use the account number to look up the appropriate profile, and then verify that Jane is allowed to access the profile by checking to see if Jane's extension of 9876 is in the access control list 402 for account 34567.

When Jane's extension is within the access control list 402, the switching system 106 can access the contact number stored for Joe in his profile, which is 1234. Thereafter, the switching system 106 can place the call to Joe. In this example the calling party number that Joe sees is 9876 because Jane did not opt to use the *75 feature access code and her client application or switching system 106 configuration is not set to force the use of the Caller Profile application. In one embodiment, the switching system 106 can provide reverse number lookup to guarantee that the call can be routed and only provide additional information if the access control list 402 is valid.

Figure 4C:
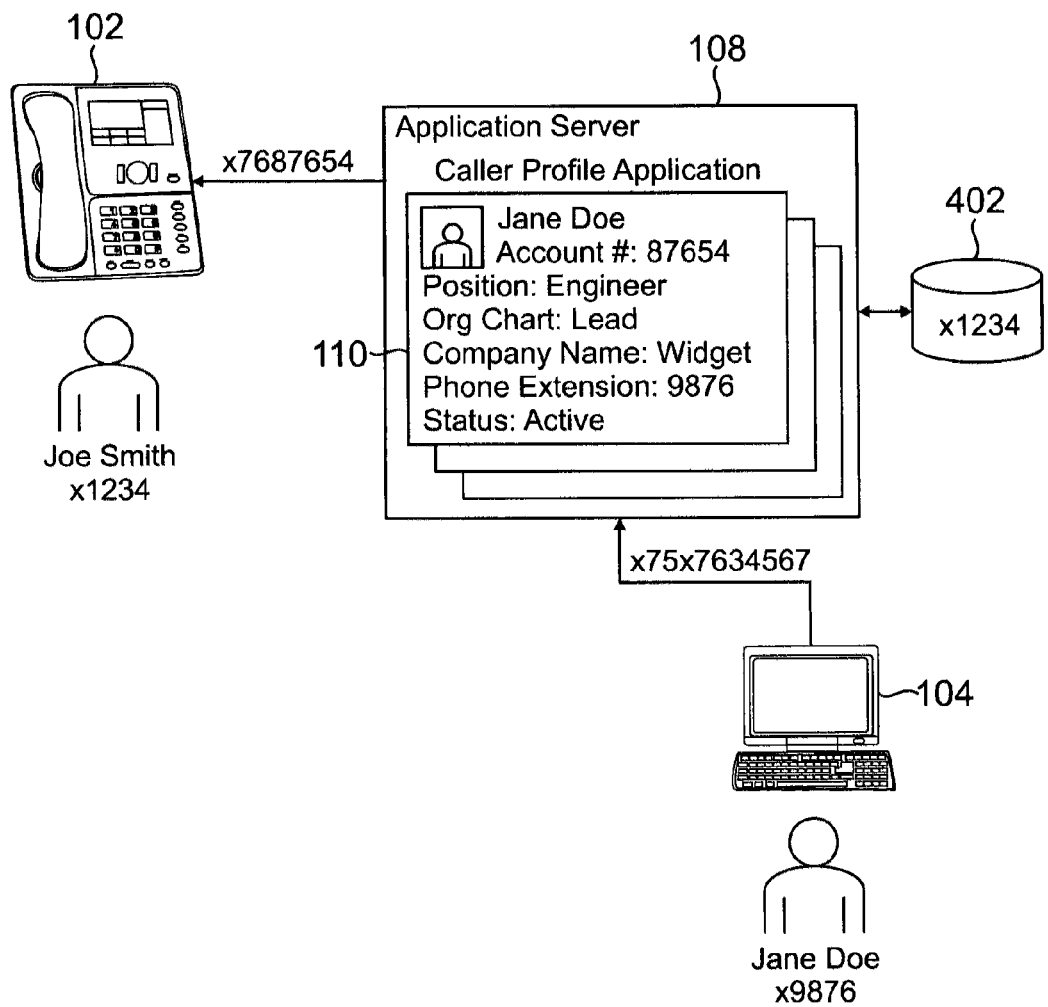
FIG. 4C is a block diagram showing exemplary procedures for accessing the application data and providing access to the application data within the scenario of FIG. 4A in accordance with one aspect of the present disclosure.

Turning now to FIG. 4C, a block diagram showing exemplary procedures for accessing the application data 110 and providing access to the application data 110 using the scenario of FIG. 4A in accordance with one aspect of the present disclosure is provided. If Jane had elected to use the Caller Profile feature access code during dialing, her client application would be defaulted to do so. The number received at the switching system 106 from Jane's device 104 could have been *75*7634567. The switching system 106 can resolve *7634567 to Joe's extension 1234, and then replace Jane's calling party number with *7687654. The *76 can be the application code and 87654 can be Jane's account number on the Caller Profile server 108. Joe's number can be added to Jane's access control list 402 and similar to before, now Joe can access Jane's application data 110.

Those skilled in the relevant art would appreciate that there can be different variations of the processes described above in a variety of settings. For example, the Caller Profile application can have various data privilege levels. When Jane is Joe's boss, she can have access to special information about him. While Joe is on vacation, Joe can forward calls from his work contact, *761234, to his voicemail since he is not there to answer. However, when the switching system 106 attempts to route the call from Jane, who has a different privilege level, it can resolve it to Joe's room phone at the resort he is staying.

The permutations and combinations of server 108 and switching system 106 interactions are plentiful and application dependent. In another scenario, a legal application can be created that allows simplified billing. Generally, calls to and from the legal office utilize database keys referencing customer information. The switching system 106 operating on a public switched telephone network (PSTN) can support a Customer Billing application. For example, Bean Lawyers PLLC can subscribe for the service. Their customer number can be 06001. When Bill calls Bean Lawyers at 1-555-555-5555 and requests legal assistance, the secretary can create an account 04011 in their system with Bill's contact information. The secretary can then inform Bill that a lawyer will call him when available.

In turn, the next available lawyer can dial *8804011 whereby *88 activates the billing feature and 04011 references the client. The contact number provided by Bill can be added into the access control list 402 to allow him to call the lawyer. Thereafter, billing commences for Bill. The calling party number is *880600104011 where *88 activates the feature, 060010 identifies the carrier database instance, Bean Lawyers PLLC, and 04011 resolves to the lawyers the secretary/direct line. Bean Lawyers PLLC can query the account at any time for billing or other information and close the account as required. Bill only knows how to reach the lawyer via the billing number and when he calls the main line again, 1-555-555-5555, the secretary can transfer the call to the account number, which can be resolved to the correct lawyer handling the case at that time.

In another scenario, where Bill decides to change jobs, the switching system 106 with the application servers 108 can be of further use. Bill can call Orange R' Us to provide them access to his resume on LinkedIn®, which is a protected feature and cannot be accessed by general viewers. Currently, Bill would need the email address of the person to whom access is to be granted.

Through the switching system 106, when Bill calls Orange R'Us, he can automatically grant them permission to view the resume section of his LinkedIn® profile. The format of the calling party number triggers an application at Orange R'Us that a LinkedIn® profile is accessible via the call information. When an employee of Orange R'Us attempts to use the call information to retrieve Bill's profile, the system can authorize the release of this information based on the fact that permission was granted by the telecommunications system during the initial call setup. Any other party who dials the calling party number would be denied.

The foregoing description is provided to enable any person skilled in the relevant art to practice the various embodiments described herein. Various modifications to these embodiments will be readily apparent to those skilled in the relevant art, and generic principles defined herein can be applied to other embodiments. Thus, the claims are not intended to be limited to the embodiments shown and described herein, but are to be accorded the full scope consistent with the language of the claims, wherein reference to an element in the singular is not intended to mean "one and only one" unless specifically stated, but rather "one or more." All structural and functional equivalents to the elements of the various embodiments described throughout this disclosure that are known or later come to be known to those of ordinary skill in the relevant art are expressly incorporated herein by reference and intended to be encompassed by the claims. Moreover, nothing disclosed herein is intended to be dedicated to the public regardless of whether such disclosure is explicitly recited in the claims.

What is claimed is:

1. A computer-implemented method for providing application data comprising:
    receiving an identifier corresponding to a called party from a calling device,
    accessing application data of a calling party of said calling device by receiving a code from the calling device and, upon recognition of the code, allowing access to the application data;
    adding the identifier of the called party to an access control list;
    determining an identity of said calling party from said application data;
    providing said identity of said calling party along with authorization to access said application data to said called party;
    receiving a request for the application data by the called party, the request including the identifier of the called party;
    determining whether the identifier of the called party included with the request for the application data is within the access control list; and
    providing the application data after verifying that the called party is within the access control list.

2. The computer-implemented method of claim 1, wherein accessing said application data of said calling party comprises accessing said application data by default.

3. The computer-implemented method of claim 1, wherein providing said authorization to said called party comprises presenting a code that allows access to said application data.

4. The computer-implemented method of claim 1, wherein accessing said application data of said calling party comprises retrieving a number of said calling party to access an application server having said application data.

5. The computer-implemented method of claim 1, comprising providing name and number information to the called party.

6. The computer-implemented method of claim 1, wherein the access control list is stored on a switching system.

7. The computer-implemented method of claim 1, wherein the access control list is stored on application server.

8. The computer-implemented method of claim 1, comprising the called party accessing the application data directly form an application server.

9. A system comprising:
a switch coupled to at least one application having application data;
wherein said switch receives authorization by a first party for a second party to access application data of said first party from said at least one application by passing a called party number and an access code and upon recognition of said access code, said switch enabling said authorization for said second party to access said application data, said switch providing said authorization to said second party for said second party to access said application data from said at least one application, wherein enabling said authorization for said second party to access said application data comprises listing said called party number within an access control list.

10. The system of claim 9, wherein said switch is a private branch exchange.

11. The system of claim 9, wherein said access code is determined by said switch.

12. The system of claim 9, wherein said at least one application comprises at least one client profile for said application data.

13. The system of claim 9, wherein said switch receiving authorization by said first party for said second party to access application data of said first party from said at least one application comprises receiving an access code from said first party.

14. A caller identification system comprising:
at least one processor, and
a memory operatively coupled to said processor, said memory storing program instructions that when executed by said processor, causes said processor to:
receive a called party number and an access code from a calling device;
adding an identifier information of a called party to an access control list:
identify a called party corresponding to said called party number;
receive a request for said application data by said called party, the request including the identifier information of said called party;
authorize said called party to access calling party application data upon recognition of said access code from said calling device; and
inform said called party of said access to said calling party application data.

15. The caller identification system of claim 14, wherein informing said called party of said access to said calling party application data comprises triggering an application on a device of said called party.

16. The caller identification system of claim 14, wherein said memory storing program instructions when executed by said processor causes said processor to update said calling party application data.

* * * * *